UNITED STATES PATENT OFFICE.

JOHN CARLTON BELK, OF TOMBSTONE, ARIZONA TERRITORY, ASSIGNOR OF ONE-HALF TO RODERICK FERDINAND HAFFORD, OF SAME PLACE.

PROCESS OF MANUFACTURING TEXTILE FIBERS FROM THE YUCCA OR OTHER CACTI.

SPECIFICATION forming part of Letters Patent No. 336,376, dated February 16, 1886.

Application filed October 20, 1884. Serial No. 146,053. (Specimens.)

*To all whom it may concern:*

Be it known that I, JOHN CARLTON BELK, a citizen of the United States, residing in Tombstone, Cochise county, Arizona Territory, have invented certain Improvements in the Manufacture of Fiber from Plant-Leaves, of which the following is a full, clear, and exact description.

The object of my invention is to produce long, fine, and strong textile fibers suitable for the manufacture of cordage and textile fabrics from the leaves of the plants or shrubs known as *Yucca baccata,* (Spanish bayonet,) the *Yucca constricta,* (soap plant,) and the *Dasylirion Wheeleri,* (sotol;) and this object I attain by treating the leaves of the said plants as hereinafter described. The leaves of these plants are covered with a fine thin film or skin impervious to water, and, owing to the presence of this film or skin and to the character of the fleshy glutinous matter which surrounds the fiber in the leaves, the attempts which have heretofore been made to produce from these leaves a commercial fiber suitable for the varied purposes of manufacture have been unsuccessful; but by treating the leaves in the manner hereinafter described I have been able to produce simply and economically a long, fine, bright, and soft fiber of unimpaired strength, suitable for the manufacture of cordage and textile fabrics.

The nature of my process of treating the leaves to produce commercial fiber is briefly as follows: I first soften the film or skin which covers the leaves, so as to facilitate its rupture and removal by pressure. A change is effected in the consistency of the fleshy glutinous matter which surrounds the fibers of the leaves, so that it will be readily expelled by pressure without injury to the fibers, and so as to thereby leave the fiber exposed and accessible to the action of an alkaline solution, which is then applied. The fiber is thereby relieved of all adhering fleshy glutinous matter by converting the latter into a saponaceous substance, which is soluble in water, and which is then removed by washing.

The leaves of the plants are cut in the green state and the points of them are removed. These leaves are then subjected to immersion and soaking for about one hour (more or less) in a suitable vat of hot water, the temperature of which is preferably kept at or near the boiling-point. The leaves are then subjected to pressure by being passed between revolving rollers. The pressure thus obtained ruptures and removes a portion of the film or skin which covers the leaves and expels a portion of the fleshy glutinous matter which surrounds the fiber, leaving the fiber exposed and readily accessible in all its parts to the solution next applied. The bruised leaves are then placed in shallow latticed cribs, in order to keep the fiber straight and free from entanglement and to facilitate the action of the alkaline solution, the ends of the leaves where they are severed from the nodes of the plants being laid in the same direction. The cribs containing the leaves are then placed on top of each other in suitable vats containing an alkaline solution, preferably heated to the boiling-point. The solution is composed of water and hard-wood ashes in the proportion of about forty pounds of ashes to one hundred and twenty gallons of water, or its equivalent, or of about eighteen pounds of concentrated lye to one thousand gallons of water, or any alkaline solution of equal strength. Any commercial or natural alkali may be used. The leaves are allowed to remain in this solution about four hours, the solution being kept at or near the boiling-point. The time of action varies with the age and consequent toughness of the leaves and the strength of the solution. The proportions and strength of the solution and time of action may be varied without departing from the spirit of my invention. When the fleshy glutinous matter surrounding the fiber has changed to a soapy, slimy consistency, and from a greenish to a yellowish gray color, the cribs are removed from the vats, and the fiber is washed while in the cribs in clean water. The washed fiber is then removed from the cribs and is dried and combed, and is then ready for immediate manufacture.

The article thus produced from the leaves of the plants described is a long, fine, strong, bright, and clean fibrous material, highly textile in character, of a white or whitish color, suitable for the manufacture of cordage and textile fabrics.

I claim as my invention—

1. The process herein described of producing commercial fiber from the leaves of the plants known as the *Yucca baccata, Yucca constricta*, and *Dasylirion Wheeleri*, said process consisting in first removing the skin of the leaves, and then freeing the fibers from their surrounding glutinous matter, substantially as set forth.

2. The process of producing commercial fibers from the leaves of the plants described, said process consisting in first removing the skin of the leaves by pressure, and, secondly, freeing the fibers from their glutinous covering by steeping in an alkaline solution, substantially as set forth.

3. The process of producing commercial fibers from the plants described, said process consisting in first soaking the leaves in hot water, then subjecting them to pressure and removing the skins, then subjecting the fibers to an alkaline solution, and finally washing the treated fibers, all substantially as set forth.

4. The process of producing commercial fibers from the leaves of the plants herein described, said process consisting in first removing the outer skin, then subjecting the fibers with their glutinous covering to the action of a heated alkaline solution to free the fibers from the said covering, and removing said covering, all substantially as specified.

5. As a new article of manufacture, the herein-described long commercial fiber produced from the leaves of the plants known as the *Yucca baccata, Yucca constricta*, and *Dasylirion Wheeleri*.

JOHN CARLTON BELK.

Witnesses:
CORNELIUS WILSON CLUM,
HOWARD FORD HERRING.